Figures 1, 2:
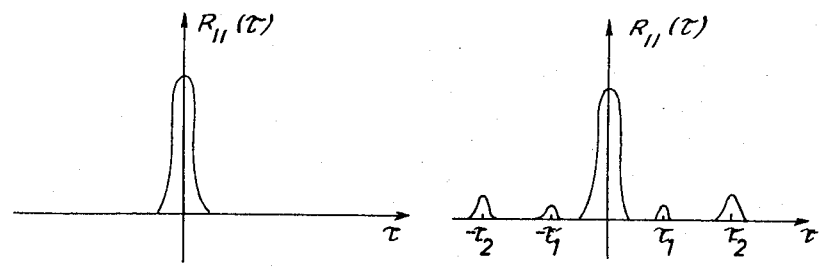

United States Patent
De Cock

[15] 3,697,759
[45] Oct. 10, 1972

BEST AVAILABLE COPY

[54] METHOD OF TESTING A STRIP MATERIAL AND APPARATUS THEREFOR UTILIZING AUTOCORRELATION

[72] Inventor: Etienne Marie De Cock, Hamme, Belgium

[73] Assignee: Agfa-Gevaert N.V., Mortsel, Belgium

[22] Filed: July 28, 1971

[21] Appl. No.: 166,661

[52] U.S. Cl. .............250/209, 250/219 DF, 356/200
[51] Int. Cl. ...........................H01j 39/12, G01n 21/32
[58] Field of Search ..................250/219 DF, 209; 356/200, 237, 356/238

[56] References Cited
UNITED STATES PATENTS
3,620,630   11/1971   Hergenrother ..250/219 DF X FOREIGN PATENTS OR APPLICATIONS
211,654   10/1960   Austria......................356/238

Primary Examiner—Walter Stolwein
Assistant Examiner—T. N. Grigsby
Attorney—William J. Daniel

[57] ABSTRACT

A method of testing a moving strip of material, wherein the density of the strip is measured at two successive places, the instant measurement signal obtained at the first place is multiplied by a factor which is proportional to the instant value of the measurement signal at the second place, and the average value of the resultant product signal is determined.

4 Claims, 7 Drawing Figures

METHOD OF TESTING A STRIP MATERIAL AND APPARATUS THEREFOR UTILIZING AUTOCORRELATION

The present invention relates to a method of testing a strip material.

The invention relates further to a method of testing wherein use is made of a process for determining the auto correlation function of a signal or the cross correlation function of two different signals.

The correlation of one or more signals with a so-called correlator having means for delaying one of the signals during a variable period of time is already known.

Such means may e.g. comprise a magnetic recording tape and two read out detectors, viz. one fixed read out detector positioned close to the tape and the other movable alongside thereof, wherein the time delay is practised in that a defined point on the tape has covered some distance between the moment the signal present at that point is read out by one detector and the moment this signal is read out by the other detector. In varying the distance of be covered by the tape between both detectors it may be possible to introduce a variable time delay. For determining the autocorrelation function of a signal $f(t)$ said signal is led to a multiplication device and the delayed signal is equally led thereto whereas the output signal of the multiplication device is led to a device for forming the average value, the output signal of which is given by the relation:

$$R'_{11}(\tau_a) = \frac{1}{T}\int_0^{T_o} f(t) \cdot f(t-\tau_a)\, dt \quad (1)$$

wherein $\tau_a$ is the delay time and $T_o$ the integrating time, which yields one point of the approaching correlation function $R'_{11}(\tau)$ of $f(t)$.

In applying various time delays, the correlation function is approached and this approach will be the better, as $T_o$ will be greater and the time delay difference will be smaller.

In the testing of strip material, in transmission or in reflection, by means of an electromagnetic radiation source and an electromagnetic detector a signal is obtained composed of a time dependent noise and a part which is dependent on the properties of the material (place dependent) said latter part being called "intrinsic noise". This intrinsic noise is mainly due to he cloudiness of the material i.e. the non homogeneous structure of the material.

The intrinsic noise is a place dependent statistic, ergodic and reproducible signal. In consequence, the average value and the autocorrelation function thereof are independent of the part of the material strip which has been chosen for measuring.

If at least one signal which is representative for density variations in a travelling material strip is correlated, such correlation allows the detection of periodic phenomenons in the density variations which may be useful for tracing faults in the manufacture process.

The use of a correlator in such application suffer from the drawback that the signal which is representative for density variations of the material strip must be detected with a density detector and must then be recorded e.g. on a magnetic recording tape from which it is read out by the movable and fixed detectors. By these different recording and reading-out operations the signal becomes distorted so that use must be made of a very accurate and expensive correlator for limiting this extra distortion.

It is an object of the present invention to provide an improved process for determining the place frequency distribution of the cloudiness of a strip material.

According to the invention, a method of testing a strip material is provided wherein the density variations of the material strip are detected by means of a first and a second photoelectric detector, wherein the distance covered by the strip between the moment a point of the strip passes before one photoelectric detector and the moment the same point passes in front of the other photoelectric detector is varied, the instant value of the output signal of the first photoelectric detector is multiplied by a factor which is proportional to the instant value of the output signal of the second photoelectric detector, whereupon the average value of the resultant product signal is determined.

Figure 3:
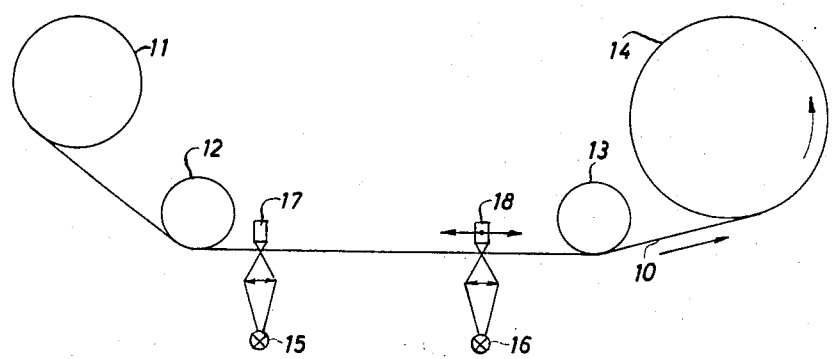
Figure 4:
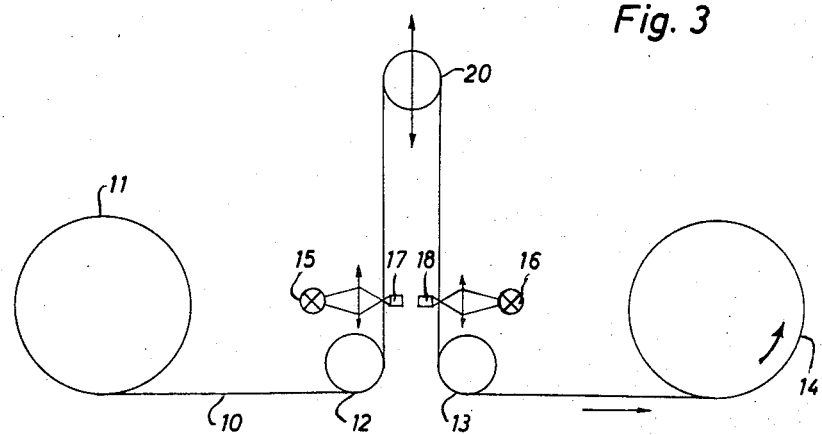
Figure 5:
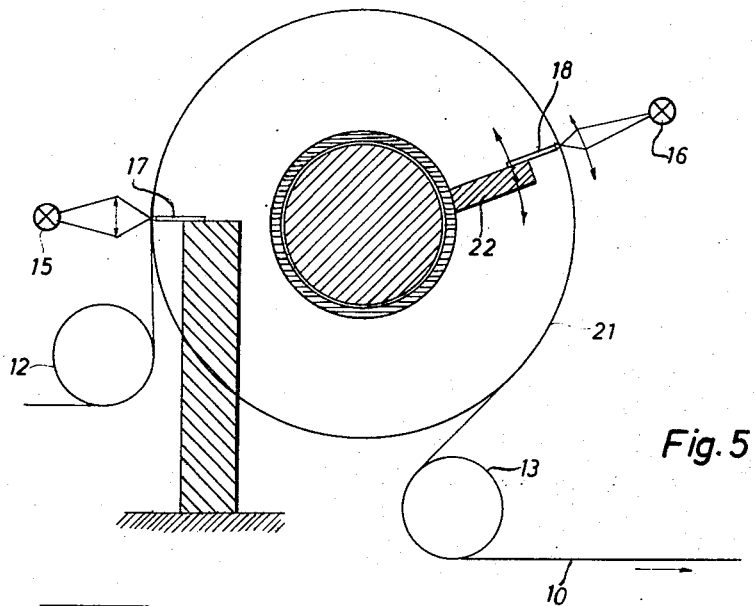
Figure 7:
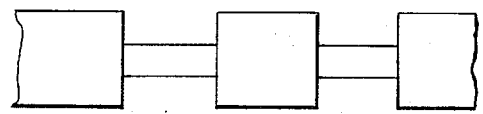
Figure 6:
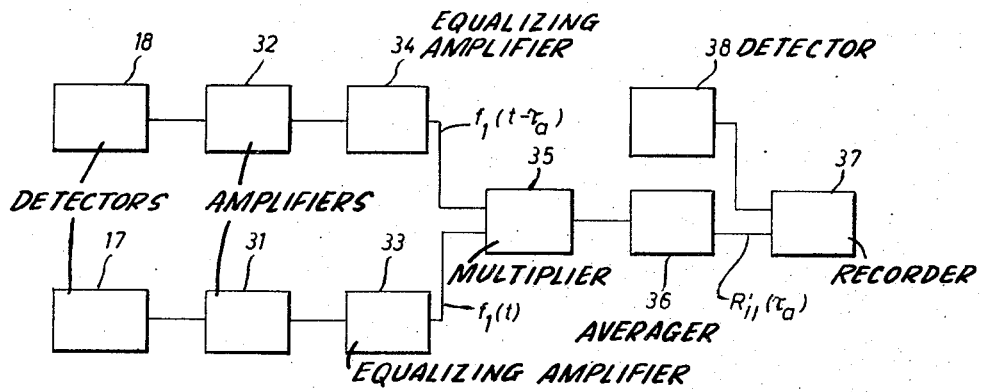

The invention will now be described more in detail by way of an example with reference to the accompanying drawings in which:

FIG. 1 represents the autocorrelation function for a white noise,

FIG. 2 represents the autocorrelation function for a noise signal having periodic components, FIG. 3 is a diagrammatic view of a first embodiment of a device for performing the method according to the present invention, FIG. 4 is a diagrammatic view of a second embodiment of a device, FIG. 5 is a cross section of part of a further embodiment, FIG. 6 is a block diagram of an electronic circuit which can be applied in a device for performing the method according to the invention, and FIG. 7 is a longitudinal section of a roller used in the embodiment of FIG. 5.

The autocorrelation function of a function $f(t)$ is given by the relation:

$$R_{11}(\tau) = \lim_{T\to\infty} \frac{1}{2T}\int_{-T}^{+T} f(t) \cdot f(t-\tau)\, dt$$

$$= \lim_{T\to\infty} \frac{1}{2T}\int_{-T}^{+T} f(t+\tau) f(t)\, dt \quad (2)$$

The cross-correlation function of the function $f_1(t)$ and $f_2(t)$ corresponds to the relation:

$$R_{12}(\tau) = \lim_{T\to\infty} \frac{1}{2T}\int_{-T}^{+T} f_1(t) \cdot f_2(t-\tau)\, dt$$

$$= \lim_{T\to\infty} \int_{-T}^{+T} f_1(t+\tau) \cdot f_2(t)\, dt \quad (3)$$

The function $R_{11}(\tau)$ for a function $f(t)$ representing a white noise is illustrated in FIG. 1. The function $R_{11}(\tau)$ has a finite value for $\tau \approx 0$ and aims at 0 for greater absolute values of $\tau$. When the signal $f(t)$ has periodic components, then $R_{11}(\tau)$ contains equally a periodic component. An example of the autocorrelation function of such a signal is illustrated in FIG. 2. Here $\tau_1$ and $\tau_2$ correspond with the periods of the periodic components. In this way it is possible to determine the different frequencies of the periodic components of a noise signal.

In an analogous way a relation between two functions $f_1(t)$ and $f_2(t)$ may be found.

In FIG. 3 a diagrammatic side view of a device for performing the method according to the invention is shown. A strip material, e.g. in the form of a photographic film 10, is taken from a supply spool 11 and guided to a take up spool 14 over one or more small guide rollers 12, 13. Between these guide rollers two radiation sensitive detectors 17 and 18, such as phototransistors, are positioned at one side of the film 10 whereas at the other side of the film 10 the lamps 15 and 16 with appertaining optica are positioned opposite the detectors 17 and 18 in such a way that a small light spot, e.g. a small infrared light spot, is projected on the film at the locus where the axis of the detectors 17 and 18 intersect the film 10. In the embodiment according to FIG. 3 the detector 18 may move alongside of the film 10 as indicated by the arrows.

According to the embodiment of FIG. 4, the film is guided between guide rollers 12 and 13 over a roller 20 being displaceable in the direction indicated by the arrows. Preferably the diameter of the roller 20 is equal to the distance between the guide roller 12 and 13 so that the part of the film between the roller 12 and the guide roller 20 runs parallel with the part of the film between the roller 20 and the guide roller 13. When the roller 20 is displaced both film parts remain parallel with each other. In the illustrated embodiment the light-sensitive surface of the detector 17 is directed to that part of the surface of the film which extends between the rollers 12 and 20, and the lamp 15 with its optical system is situated opposite the detector 17 at the other side of the film. The detector 18 is positioned so that its light-sensitive surface is directed to the part of the film between the rollers 20 and 13 while the lamp 16 with its optical system is situated opposite the detector 18 at the other side of the film.

In the embodiment of FIG. 5 use is made of a so-called crenelated roller described in our British Application 27,617/70 filed June 8, 1970. Here the film is guided between the rollers 12 and 13 over a roller 21 which is provided with axially alternating parts of greater and smaller diameter, see FIG. 7. At the level of a part with smaller diameter a fixed detector 17 is positioned at one side of the film, whereas a lamp with an optical system 15 is arranged opposite the detector 17 at the other side of the film. A second movable detector 18 is mounted on an arm 22 which is journalled on the part of the crenelated roller with smaller diameter. In this way the distance covered by the film 10 between the detectors 17 and 18 may be adjusted continuously.

The operation of the device is as follows. The film is unwound from the spool 11 and guided over various rollers to the take up spool 14. The signal detected by the detector 17 is representative for the intrinsic noise of e.g. an unexposed photographic film. This signal is referred to as $f_1(t)$. Then the signal detected by the detector 18 may be represented by $f_1(t - \tau_a)$ wherein $\tau_a$ represents the time needed by the film for its travelling from the locus in front of detector 17 to the locus in front of detector 18.

The output signal of the detector 17 is amplified in an amplifier 31, whereas the output signal of the detector 18 is amplified in an amplifier 32 (see FIG. 6). For neutralizing the faults which may arise by mechanical inaccuracies in changing the distance covered by the film 10 between the detectors 17 and 18, equalizing amplifiers 33 and 34 are provided the respective inputs of which are connected to the outputs of the amplifiers 31 respectively 32. The amplification factors of the equalizing amplifiers are automatically controlled so that the average value of the noise is equal at the output of both equalizing amplifiers. The outputs of the amplifiers 33 and 34 are connected with the outputs of a multiplication device 35 which delivers at its output a signal which is proportional to the instant value of the produce of its two input signals. The multiplication device 35 is connected with a device 36 which determines the average value of the output of the multiplication deice 35 for some time $T_o$. The output of the device 36 for forming the average value is connected with a recorder 37 a second input of which is connected with a detector 38 for detecting the position of the detector 18. After each integration time $T_o$ the recorder 37 plots out a point of the approaching autocorrelation curve of the signal recorded by means of the detector 17.

The space frequency is directly given by the distance covered by the film between the detectors 17 and 18 independent of the variations of the film travel speed.

When the film travel speed does not vary too strongly, the result is almost independent of this speed. The approaching value of the correlation function by formula (1) improves thereby as the integration time $T_o$ becomes greater.

On the other hand it is also possible to shift the detector 18 continuously, but thereby the approaching value of the autocorrelation function is less good.

In positioning the detectors 17 and 18 at a different distance from an edge of the film a cross correlation can be obtained since two different functions are detected by means of both detectors.

As a further application of the method according to the invention may be cited the contactless measuring of the film speed. Until now the film speed was usually measured by means of a small roller rotated by the film and provided with a tachometer mounted on such a roller. The film speed can be determined by means of the cross correlation of the signals originating from the detectors 17 and 18 wherein the film speed is equal to:

$$V_{film} = a/\tau_a$$

wherein:
 $a$ = distance covered by the film between the two detectors 17 and 18, and
 $\tau_a$ = the time needed by the film for covering the distance between the detectors 17 and 18. $\tau_a$ can be determined by the cross correlation function of the signals of the detectors 17 and 18.

In this way a simple and appropriate device may be provided which may be arranged in the production cycle for the detection of faults in the production process after a very short time and in a non destructive manner.

What we claim is:

1. Method of testing a moving strip material, wherein the density variations of the strip are detected by means of a first and a second photoelectric detector, the distanCe covered by the strip between the moment a point of the strip passes in front of one photoelectric detector and the moment the same point of the strip passes in front of the other photoelectric detector is varied, and the instant value of the output signal of the first photoelectric detector is multiplied by a factor which is proportional to the instant value of the output signal of the second photoelectric detector, whereupon the average value of the resultant product signal is determined.

2. Method of testing a moving strip material, wherein
  a. the density variations of the strip are detected by means of a first and a second photoelectric detector, the distance covered by the strip between the moment a point of the strip passes in front of one photoelectric detector and the moment the same point of the strip passes in front of the other photoelectric detector having a certain value,
  b. the instantaneous value of the output of the first photoelectric detector is multiplied by a factor which is proportional to the instantaneous value of the output of the second photoelectric detector, and
  c. the product signal is integrated during a predetermined time, what yields a point of a correlation curve, whereafter said distance is varied and the steps (b) and (c) are repeated to determine successive points of a correlation curve.

3. Method of testing according to claim 2, wherein the time elapsing between successive variations of the distance is constant.

4. Method of testing according to claim 1, for the autocorrelation of a signal which is representative for density variations in a moving material strip, wherein the density variations of the strip are detected at a determined transverse distance from an edge of the strip by means of a first photoelectric detector, the density variations of the strip are detected by means of a second photoelectric detector which is situated at the same transverse distance from the edge of the strip as the first photoelectric detector, the distance covered by the strip between the moment a point of the strip passes in front of one photoelectric detector and the moment the said point passes in front of the other photoelectric detector is varied, and the instant value of the output signal of the first photoelectric detector is multiplied by a factor which is proportional to the instant value of the output signal of the second photoelectric detector whereupon the average value of resulting product signal is determined.

* * * * *

UNITED STATES PATENT OFFICE
CERTIFICATE OF CORRECTION

Patent No. 3,697,759  Dated October 10, 1972

Inventor(s) Etienne Marie DE COCK

It is certified that error appears in the above-identified patent and that said Letters Patent are hereby corrected as shown below:

In the Heading of the Patent, insert -- Claims priority British Application No. 36,765/70 of July 29, 1970. --.

Signed and sealed this 24th day of April 1973.

(SEAL)
Attest:

EDWARD M. FLETCHER, JR.　　　ROBERT GOTTSCHALK
Attesting Officer　　　　　　　Commissioner of Patents

FORM PO-1050 (10-69)